Dec. 23, 1930.    S. A. GUIBERSON, JR    1,786,012
ELASTIC RECIPROCATING MEMBER
Filed Jan. 20, 1928
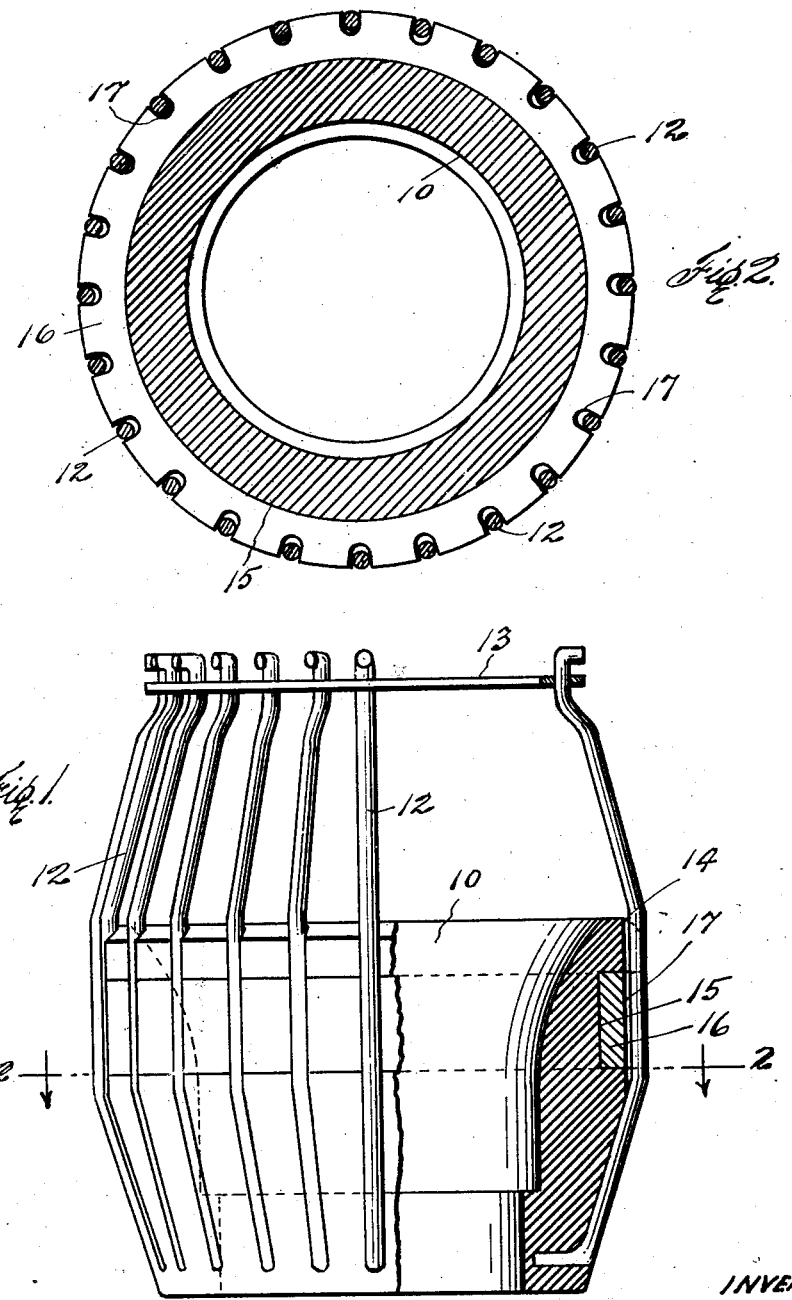
INVENTOR
S. A. Guiberson Jr.
by Jack P. Ashley
ATTORNEY Patented Dec. 23, 1930

1,786,012

UNITED STATES PATENT OFFICE

SAMUEL A. GUIBERSON, JR., OF LOS ANGELES, CALIFORNIA, ASSIGNOR TO THE GUIBERSON CORPORATION, OF DALLAS, TEXAS, A CORPORATION OF DELAWARE

ELASTIC RECIPROCATING MEMBER

Application filed January 20, 1928. Serial No. 248,219.

This invention relates to new and useful improvements in elastic reciprocating members.

The invention has particularly to do with that type of elastic reciprocating members, such as swabs, pistons, plungers and the like having a circumferential portion sliding upon the inner walls of a tubular member and thereby subjected to wear by reason of such frictional contact.

One object of the invention is to provide the elastic members with a circumferential replaceable insert arranged and adapted to take the wear at the contact area, so that the elastic member may be used indefinitely and the insert replaced when worn.

Another object of the invention is to provide an elastic member having all the qualities necessary to flexibility and expansion and at the same time permitting the use of a replaceable insert for taking the wear, which insert may be of the same characteristic material as the member or which may be of a different composition better adapted to resist wear than the remainder of said member.

A construction designed to carry out the invention will be hereinafter described, together with other features of the invention.

The invention will be more readily understood from a reading of the following specification and by reference to the accompanying drawings, in which an example of the invention is shown and wherein:

Fig. 1 is a view of a swab cup and cage, partly in elevation and partly in section, and the cup equipped with a replaceable insert constructed in accordance with my invention, and Fig. 2 is a horizontal cross-sectional view taken on the line 2—2 of Fig. 1.

In Figs. 1 and 2 I have illustrated a swab cup 10 having vertical grooves 11 in its periphery. Reinforcing wires or rods 12 are seated in these grooves flush with the surface of the cup and extend above the lip of the cup. The upper ends of the rods are bent and confined in a retaining ring 13. This cup is used in connection with other members which it is not considered necessary to illustrate as the invention does not relate to said rods.

When this cup is elevated in a well tubing, its upper cylindrical portion will be bulged outward into contact with the side walls of the tubing. This will cause the portions between the rods 12 to undergo excessive wear, with the result that an entire new cup must be substituted. The lower portion of the cup very seldom wears and as the bulge takes place below the lip 14, said lip is not subjected to excessive wear.

In carrying out the invention I provide an annular groove or recess 15 in the outer vertical wall of the cup. I have shown this groove as rectangular in cross-section, but it is obvious that this groove may be given any cross-sectional shape suitable for receiving the particular insert used. Within this groove I fit an annulus or circular ring 16, which is provided in its outer surface with vertical grooves 17 spaced to register with the grooves 11 for receiving the rods 12.

It is the usual practice to make the cup 10 of rubber or so called rubber composition and the ring 16 may be made of like material and sprung into the groove 15 before the rods 12 are assembled. It will be obvious to those skilled in the art that the body of the cup may be made of suitable material for carrying the load and giving the necessary elasticity, and the ring 16 could be made of material better suited to resist wear. It is not necessary that the ring have the same degree of elasticity as the body. When the cup is loaded the radial pressure will bulge the upper portion of the cup and cause the ring 16 to contact with and ride upon the inner wall of the tubing, thus taking the wear.

It may be found that better results are had by making the ring 16 of entirely different material from the cup. For instance, a composition composed mostly of fabric with very little rubber or rubber composition may in some instances produce a better ring.

It is within the contemplation of the invention to make the ring of any material suitable for the purpose, to make it of any desirable shape, and to use it as an insert in any reciprocating member where such use is found advantageous. It is, of course, desirable to have the ring removable so that when it is worn it may be replaced without replacing the body of the cup 10.

Various changes in the size and shape of the different parts, as well as modifications and alterations, may be made within the scope of the appended claims.

What I claim, is:

1. As a sub-combination in a radially expanding elastic fluid lifting member having spaced vertical grooves, a replaceable annulus adapted to be seated circumferentially in the outer surface of said member and having spaced vertical grooves in its outer surface adapted to aline with the grooves of the lifting member for receiving reinforcing wires.

2. An elastic member of the class described, including a radially expansible fluid lifting member, a cage comprising reinforcing wires secured at one end to the member and extending substantially parallel with its outer face, and a replaceable annulus adapted to be seated circumferentially in the outer surface of said member and having spaced grooves at its outer face for receiving the reinforcing wires.

3. An elastic member of the class described, including a radially expansible fluid lifting member having spaced vertical grooves, reinforcing wires secured to the member and seated in the grooves, and a replaceable annulus seated circumferentially at the outer face of said member and having portions projected intermediate said wires to receive the frictional wear.

In testimony whereof I affix my signature.

SAMUEL A. GUIBERSON, Jr.